United States Patent [19]

Kuhnen

[11] 4,213,025

[45] Jul. 15, 1980

[54] APPARATUS FOR CONNECTING METALLIC PARTS BY MEANS OF ARC FUSION WELDING

[75] Inventor: Gottfried Kuhnen, Oberrohrdorf, Switzerland

[73] Assignee: BBC Brown, Boveri & Company, Limited, Baden, Switzerland

[21] Appl. No.: 960,469

[22] Filed: Dec. 14, 1978

Related U.S. Application Data

[62] Division of Ser. No. 809,122, Jun. 22, 1977.

[30] Foreign Application Priority Data

Jul. 2, 1976 [CH] Switzerland ............... 8490/76

[51] Int. Cl.² ................................. B23K 9/18
[52] U.S. Cl. ................... 219/73.2; 219/73.21; 219/124.33; 219/137.44
[58] Field of Search ............. 219/73.2, 73.21, 124.33, 219/137.44, 137.51, 137.52, 137.61, 138, 140, 141

[56] References Cited

U.S. PATENT DOCUMENTS

| | | | |
|---|---|---|---|
| 2,179,108 | 11/1939 | Westberg | 219/137.61 |
| 2,839,666 | 6/1958 | Launder | 219/137.44 |
| 3,730,136 | 5/1973 | Okada | 219/137.44 X |
| 3,825,719 | 7/1974 | Jonsson | 219/137.61 |
| 3,859,495 | 1/1975 | Takahashi | 219/73.2 X |
| 3,882,300 | 5/1975 | Karlsson | 219/124.33 X |
| 3,890,482 | 6/1975 | DiBenedetto | 219/73.2 X |

FOREIGN PATENT DOCUMENTS

| | | | |
|---|---|---|---|
| 623837 | 12/1935 | Fed. Rep. of Germany | 219/137.44 |
| 1063290 | 4/1954 | France | 219/137.61 |

*Primary Examiner*—Richard R. Kucia
*Attorney, Agent, or Firm*—Werner W. Kleeman

[57] ABSTRACT

An apparatus for connecting metallic parts, and metallic parts so produced, by means of arc fusion welding by producing a low volume welding seam (narrow gap welding), wherein the workpiece parts to be joined and forming a narrow gap are initially welded at their butt joint by means of, for instance, electron-beam welding, plasma-arc welding, laser-beam welding or argon arc-welding to produce a base seam with or without filler material, and thereafter the workpiece flanks forming the narrow gap are united by alternately depositing weld beads at first one and the other workpiece flank by submerged-arc welding.

12 Claims, 10 Drawing Figures

APPARATUS FOR CONNECTING METALLIC PARTS BY MEANS OF ARC FUSION WELDING

CROSS-REFERENCE TO RELATED CASE

This is a divisional application of my commonly assigned, copending U.S. application Ser. No. 809,122, filed June 22, 1977.

BACKGROUND OF THE INVENTION

The present invention relates to a new and improved apparatus for coalescing or interconnecting metallic parts by means of arc fusion welding with a low volume welding seam, generally referred to in the art as narrow gap welds, and also relates to the thus produced metallic parts.

In order to join together thick-wall metallic parts by welding there are presently employed low volume welding seams (narrow gap welding) for economical, thermal and metallurgical reasons. In order to produce such type welding seams there are especially known to the art the use of the shielded-metal-arc-process and electroslag welding. The underlying principles of such welding techniques have been disclosed in numerous publications (see e.g. C. A. Butler, R. P. Meister und M. D. Randall: "Narrow Gap Welding—A Process for All Positions", Weld. Journ. Feb. 1969, pages 102–108; I. D. Henderson, K. Seifert und H.-D. Steffens: "Festigkeits- und Zuml/a/ higkeitsverhalten von Tiefspaltschweissnuml/a/ hten am Stahl 22NiMoCr 37", DVS-Berichte Nr. 32(1974), pages 321–330; L. E. Stark: "Electroslag Welding with a Consumable Guide Plate and Fiberized Flux", DVS-Berichte Nr. 32 (1974), pages 155–159; L. P. Wolff: "Volumenarme Nahtvorbereitung an dickwandigen Bauelementen", DVS-Berichte Nr. 32(1974), pages 217–223).

The shielded-metal-arc-welding process is usually generally associated with the occurrence of rather pronounced spraying or spattering of metallic particles, sometimes referred to as "spitting" of weld metal, at the region of the arc/shielding gas/molten bath. Spattering can be influenced within certain limits by the nature of the arc, the shielding or protective gas and the composition of the welding wire as well as the base metal, but is never completely avoidable. The resulting spatters contaminate the welding wire-feeding tube, the shielding or protective gas nozzle and the workpiece flanks or sides of the welding groove. Furthermore, the oxidation products of the molten bath upon the surface of the welding beads form fixedly adhering glass-like slag deposits which only can be removed with extreme difficulty and preclude continuous welding in multiple layers. Consequently, the economics of the process are impaired. Contaminated wire feed elements, in turn, produce poor contact of the current infeed and irregular wire feed. Shielding gas nozzles which are coated with spatters lead to the formation of vortexes and disturbances in the shielding gas atmosphere at the region of the molten bath. Spatters at the workpiece flanks of the welding groove produce inclusions and a faulty joint between the base metal and the weld. Finally, slag deposits upon the welding beads lead to inclusions between the individual layers. With this technique it is only possible to produce qualitatively high-grade welding seams by continuously cleaning and removing the spatters and slag.

With electroslag welding there is utilized in conventional manner, the heat produced by the electrical resistance in a conductive slag bath for melting the base metal and filler material. In order to initiate this process it is however necessary at the start of the welding operation to initially strike an arc and to melt a sufficient quantity of slag forming agents and to bring such into a conductive state. On the other hand, at the end of the welding operation the slag bath or blanket over the molten bath must be maintained by artificial means in order to completely seal the welding seam. The course of this process as a function of time as well as the geometry of these starting and terminal procedures therefore require the application of starting plates and outflow plates, which must be mounted in zones where they can be mechanically removed after or during welding. This constitutes a decisive limitation for this welding process and predominantly in the case of circular seams requires finishing and touch-up work with the aid of other welding techniques. Each interruption of the welding operation multiplies the previously mentioned difficulties, since each time restarting of the welding operation must be carried out. Additionally, complete melting of the slag forming agents and the base metal is oftentimes not possible, leading to a reduction in the quality of the welding seam. The electroslag-welding technique works with comparatively low heating-up and cooling speeds of the filler metal as well as the neighboring thermally-influenced zones of the base metal. This produces a relatively coarse grain structure at the region of the welding seam. In order to overcome the partially poorer mechanical properties in relation to the base metal, there is necessary a subsequent normalizing or tempering of the finished welded work or workpieces. Especially in the case of complicated workpieces this leads to distortion, which only can be eliminated through expensive straightening work.

Considered from the standpoint of the field of application and the products produced, there exists the need for fabrication of large structural components which are as operationally reliable as possible, and which, upon exceeding a predetermined threshold volume and advantageously for metallurgical reasons and with respect to material quality, can be welded together from smaller forged or cast parts. In particular, there exists the need to fay large volume rotational bodies in the heavy duty machine industry from individual parts which are more accessible for material testing, less prone to disturbances in operation, can be controlled better from the standpoint of metallurgical considerations, and to weld such into monolithic workpieces or work. Such applications require welding seams of the highest quality with concomitant extreme production economics, in order to be successful in relation to other fabrication techniques.

SUMMARY OF THE INVENTION

Hence, with the foregoing in mind it is a primary object of the present invention to provide an improved apparatus for interconnecting metallic parts by means of arc fusion welding in a manner not associated with the aforementioned drawbacks and limitations of the prior art proposals, and further, to produce improved products.

Another important object of the present invention aims at providing a welding apparatus for producing narrow gap welds of the highest quality, which with considerable manufacturing economies produces inclusion-free, fine grain connections, which need not be subsequently normalized or heat-treated.

Still a further significant object of the present invention aims at the production of complicated, voluminous work from individual parts in a manner so that the greatest demands can be placed upon such work, and particularly for interconnecting bodies which are only accessible at one side for the welding process.

Yet a further noteworthy object of the present invention is to produce products obtained with the method aspects of this development which, in contrast to components or parts fabricated according to other techniques, constitutes an improvement in the end product and a reduction in the cost of fabricating the same, and also affords a broader selection spectrum of suitable materials and material combinations.

Now in order to implement these and still further objects of the invention, which will become more readily apparent as the description proceeds the method aspects of this development are manifested by the features that the workpiece parts which are to be joined or interconnected and forming a narrow gap are initially welded at their butt joint by for instance electron-beam welding, plasma-arc welding, laser-beam welding or argon-arc-welding to produce a base seam with or without filler metal or material. Thereafter the workpiece flanks which form the narrow gap are interconnected by submerged-arc welding by alternately depositing welding beads which bear against the one and then the other flank.

Not only is the invention concerned with the aforementioned method aspects, but as already indicated heretofore, also relates to apparatus for the performance thereof, which apparatus comprises means for supplying and guiding a welding wire or filler-metal wire and means for delivering the welding or powdered flux. Further, there is provided as a tool a wire infeed or feed clamp which can be pivoted transverse to the wire feed direction through an angle α and can be fixedly positionally adjusted. This wire feed clamp comprises an extension arm or bracket member equipped with a guide groove extending in the direction of the lengthwise axis thereof. This bracket or fishplate is formed of a material of high electrical conductivity. By means of two straps or bars there is mounted at the extension arm a freely rotatable lever arm having a pivotable guide shoe likewise equipped with a guide groove. The welding wire or filler-metal wire is delivered through a conductive tube to the contact location. The tube is mounted between the extension arm and the lever arm and is pressed into the guide groove of the extension arm by means of a spring adjustable by a screw and acting via the lever arm and guide shoe. Furthermore, the extension arm and the lever arm are attached by means of a handle-screw or ball grip screw or equivalent structure and a clamping plate at a support bolt which is bored through in the direction of its lengthwise axis and secured by pins.

The underlining concepts which are decisive for the inventive method reside in mechanically processing the end surfaces or faces of the workpiece parts which are to be jointed or interconnected in such a manner that when such are pushed together at the side which is non-accessible for welding there are present two contacting butt surfaces which determine the work geometry, and which can be interconnected from the exterior thereof by means of a base seam for instance according to one of the previously mentioned welding techniques. In order to perform this first connection there are particularly useful electron-beam welding, plasma-arc welding, laser-beam welding or argon-arc welding processes with or without filler material or metal. The filler metal typically is the welding wire, but it is conceivable to even use other fillers, such as metal inserts or the like. Thereafter, the narrow gap formed by the workpiece flanks is closed by a multiple layer weld carried out by submerged-arc welding. There is a stabilized arc and welding is accomplished free of "spitting" or spatters below a powder layer or flux, which simultaneously provides protection against deleterious atmospheres and enables deoxidation as well as slag formation to allow the process to proceed in a faultless manner from the standpoint of metallurgical considerations. The method of the invention is particularly advantageously employed during the fabrication of large rotor bodies for the machine industry, where welding only can be accomplished from one side i.e. there is not possible any further welding operation at the root face or side.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 3b is a side view of the wire infeed or feed clamp shown in FIG. 3a;

DETAILED DESCRIPTION OF THE PREFERRED EMBODIMENTS

Figure 1:
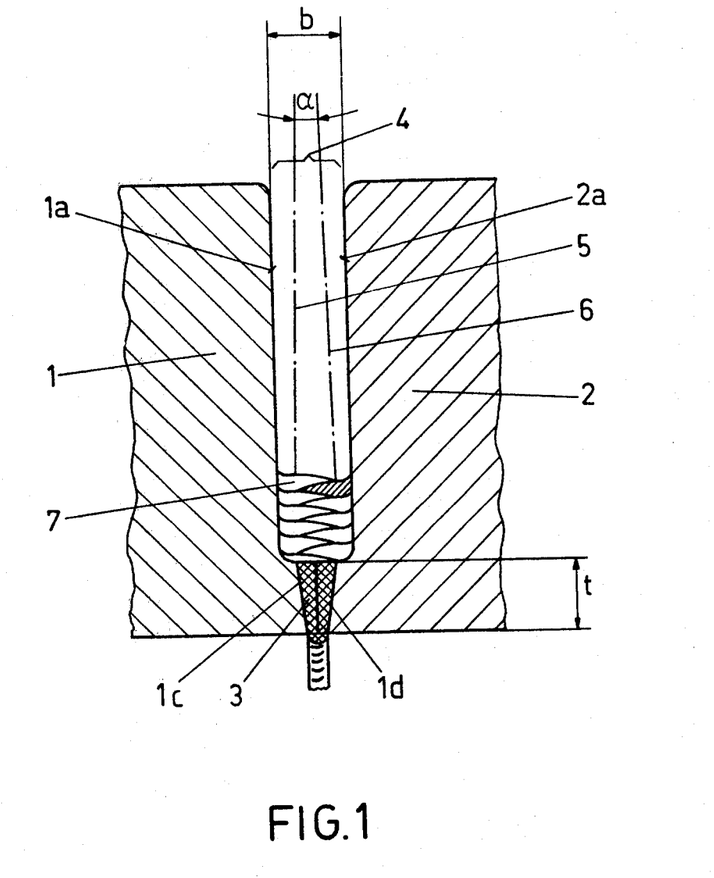
FIG. 1 is a schematic cross-sectional view through the workpiece parts which are to be jointed at the region of the welding seam.

Describing now the drawings, in FIG. 1 there is schematically illustrated a cross-section through the workpiece parts or components 1 and 2 which are to be interconnected at the region of the welding seam. The flanks or end faces or surfaces of the workpiece parts 1 and 2 which are dispositioned opposite one another in confronting relationship and which are to be welded to one another have been designated by reference characters 1a and 2a, respectively. At the side which is not accessible for welding, for instance the inside of hollow bodies, the workpiece parts 1 and 2 abut or adjoin one another at their end faces or sides 1c and 1d, and these machined or processed contact surfaces serve for alignment purposes and govern the shape of the finished work 1, 2. At such contact or contiguous surfaces, having the depth "t" the workpiece parts 1 and 2 are connected by a base seam 3 by employing typically, for instance, electron-beam welding, plasma-arc welding, laser-beam welding or argon arc-welding techniques. The narrow gap 4 of a width "b" and formed by the workpiece flanks or end surfaces 1a and 2a is thereafter closed by submerged-arc welding in such a manner that there are deposited multiple welding beads 7 which alternately bear against the workpiece flanks 1a and 2a, respectively, and in each case preferably overlap at the intermediate third of the narrow gap 4. By virtue of the momentary axial position 5 and 6 respectively, of the welding wire or filler-metal wire 8 (FIGS. 2 and 3b), pivotable through the pivot range $\alpha$, which pivot range may amount to for instance between about 1° and 7°, there is ensured that at the same time there is only fused one of the workpiece flanks or end surfaces 1a or 2a during the welding operation. Consequently, there is produced an advantageous structure and the stresses are held within tolerable limits during cooling. Depending upon the proportion of the alloying elements of the base metal the workpiece parts 1, 2 are pre-heated in suitable manner to a temperature between 200° C. to 350° C., employing well known equations for this purpose, for instance according to Dearden and O'Neill.

Figure 2:
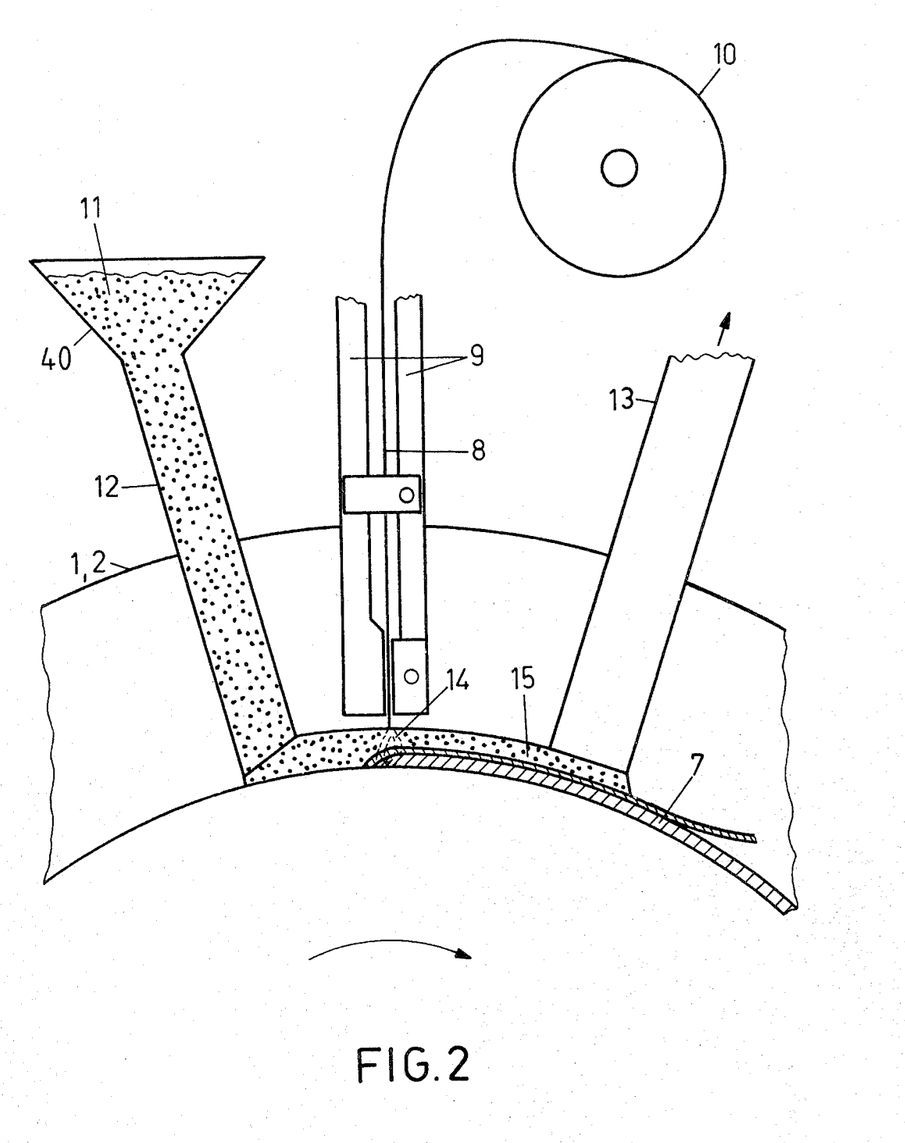
FIG. 2 is a schematic illustration of the principal construction of the welding apparatus and depicting the course of the welding operation.
Figure 3A:
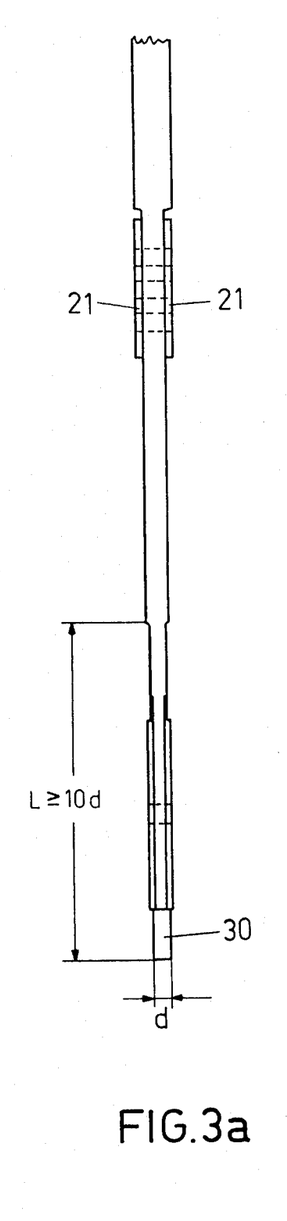
FIG. 3a is an elevational view of the lower portion of the wire infeed or feed clamp confronting the welding seam.

The width "b" of the narrow gap 4 is preferably selected to be equal to about the fourfold diameter "d" of the welding wire or filler-metal wire 8 (FIGS. 2 and 3a). Due to the pivotable mounting of the wire infeed or feed clamp 9, shown in FIG. 2, exactly at the center of the narrow gap 4 and the corresponding fixation of the exemplary depicted axial positions 5 and 6, respectively, the arc 14 (FIG. 2) possesses a constant, freely selectable spacing from the workpiece flanks or end surfaces 1a and 2a, respectively, suitable for the relevant field of application. As a result, the quantity of the base metal which is melted or fused at the relevant flanks 1a or 2a of the workpiece parts 1 and 2 respectively, as well as the composition of the weld over the entire seam cross-section is maintained constant. The effect of the inner heat-treatment or tempering is optimally utilized with multiple-layer welding by means of this mode of operation, so that neither at the weld nor at the neighboring thermally influenced zones are there contained or formed coarse grain primary structure.

Figure 3B:
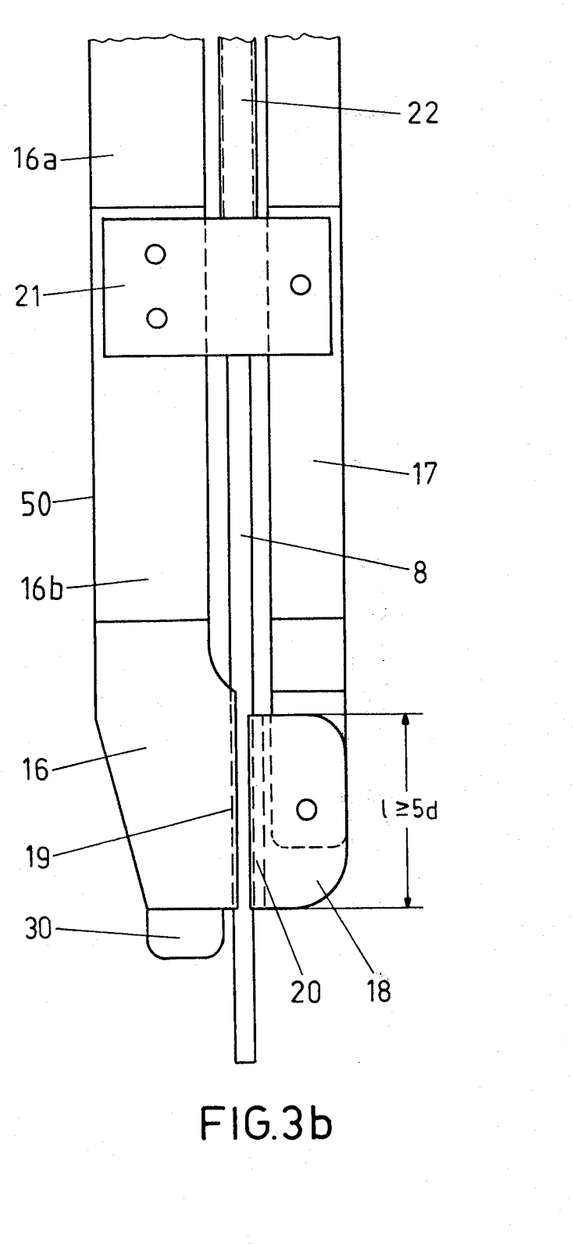

The current density amounts to preferably 50 A/mm$^2$ related to the cross-section of the welding wire 8 (FIGS. 2 and 3b). The corresponding energy in the direction of welding measured in kJ per cm of the moved through-welding path, in the direction of the welding speed, amounts to preferably 8.5 kJ/cm for a wire diameter of 2.5 mm to 12.5 kJ/cm for a wire diameter of 3.0 mm, and to 22.0 kJ for a wire diameter of 4.0 mm.

Continuing, in FIG. 2 there is schematically illustrated the basic structure of the welding apparatus and the course of the welding operation. The welding powder or powdered flux 11 which is supplied from a suitable supply container, generally indicated by reference character 40, is delivered by means of a powder feed pipe or tube 12 having a narrow cross-section to the base of the narrow gap formed by the workpiece parts 1 and 2. The welding wire or filler-metal wire 8 delivered by the wire feed roll 10 is supplied to the welding location by means of the narrow wire infeed or feed clamp 9. Between the welding wire 8 and the work 1, 2 there is formed below the powder layer or flux, at the base of the narrow gap, the covered arc 14. Due to rotation of the work 1, 2 and the feed of the welding wire 8 proportional to the rotational speed of the work, there is formed a welding bead 7 which is covered by a slag bead 15 protecting the weld from oxidation and gas absorption from the atmosphere. The excess welding powder or flux is pneumatically drawn off by means of the powder suction tube 13 and in conventional manner is recycled back into the process. Welding proceeds in such a manner that after solidification and cooling the slag bead 15 easily releases from the welding bead 7, and due to its brittleness breaks up into individual pieces and automatically falls off the work 1, 2. No further cleaning of the welding bead 7 is required. The transition from the axial position I into the axial position II of the welding wire 8, which axial positions were specifically designated by way of example in FIG. 1 by reference characters 5 and 6 respectively, and vice versa, is accomplished each time by an offset shifting at the periphery through several centimeters after attaining a complete revolution of the work 1, 2. In this way there is avoided that all of the transitions or transition locations between the neighboring welding beads are located in the same radial plane, so that there is prevented the augmentation or accumulation of slight structure irregularities.

Figures 4A, 4B, 4C:
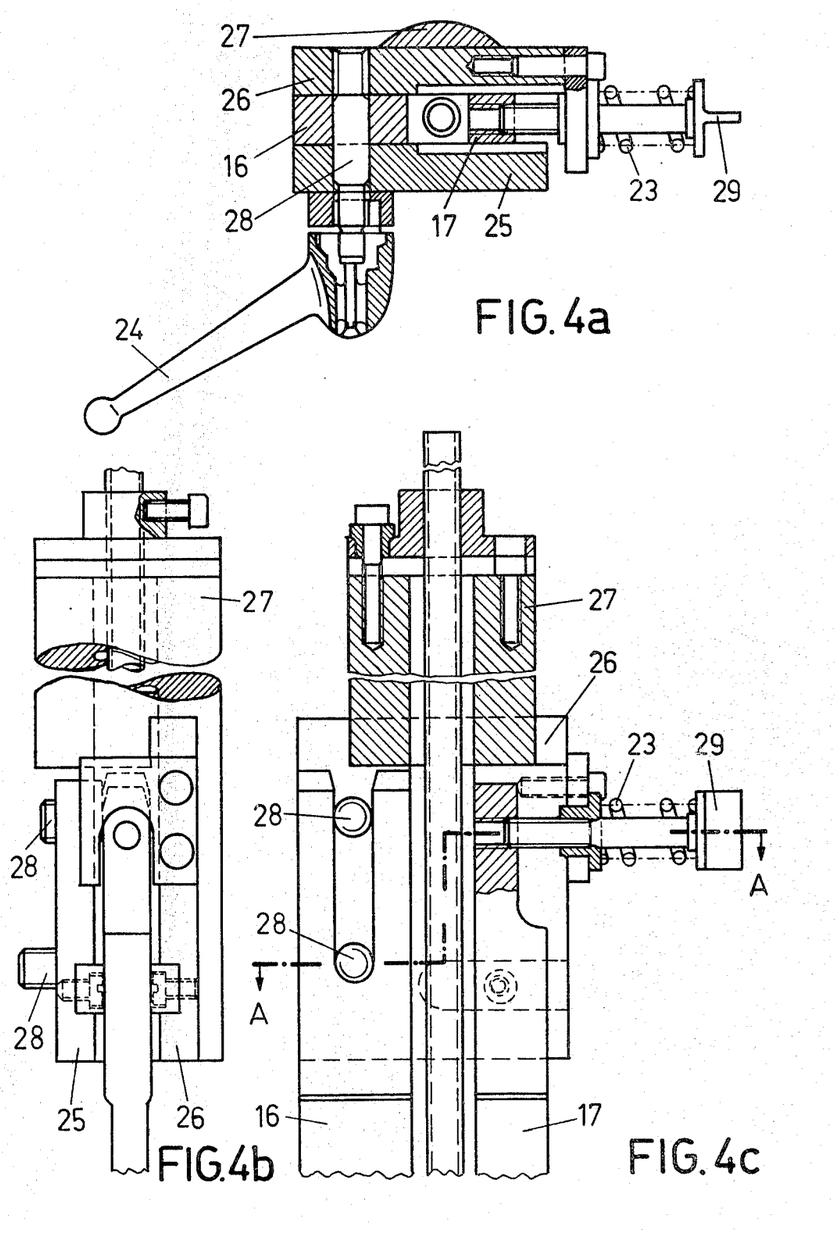
FIG. 4a is a cross-sectional view, taken substantially along the line A—A of FIG. 4c, portraying the upper portion of the wire feed clamp remote from the welding seam.
FIG. 4b is an elevational view of such upper portion of the wire feed clamp.
FIG. 4c is a side view of such upper portion of the wire feed clamp.

Generally speaking, in FIGS. 3a, 3b and FIGS. 4a to 4c there are illustrated elevational, side and cross-sectional views of the wire feed clamp 9. In particular FIGS. 3a and 3b show the lower portion of the wire feed clamp 9 which confronts the weld seam or weld, whereas FIGS. 4a to 4c show the upper part of such wire feed clamp which faces away from the welding seam and which is attached in suitable manner to a conventional and therefore not here particularly illustrated apparatus of the welding machine which is responsible for the wire infeed. The wire feed clamp 9 comprises an extension arm or bracket member 16 or equivalent structure which is equipped at its lower end confronting the welding seam with a guide groove 19 possessing a circular or arc-shaped rounded portion or depression of essentially the same diameter as the welding wire 8. At the intermediate region of the extension arm 16 there are attached thereto the straps or bars 21 which carry the rotatably mounted lever arm 17 at which there is rotatably secured at the lower end a guide shoe 18 equipped with a guide groove 20 analogous to the guide groove 19 of the extension arm or bracket member 16. In order to maintain as small as possible the dimension "b" of the narrow gap 4 (FIG. 1), the lower portions or parts of the extension arm or arm member 16 and the guide shoe 18 are designed in an axial width, related to the lengthwise axis of the work 1, 2, which does not exceed the thickness "d" of the welding wire 8. The radial dimensions of the part of the extension arm 16 offset through the axial width "d" and the guide shoe 18 (dimensions "L" and "l"), as indicated in FIG. 3b, are advantageously maintained such that the following relationship prevails:

$$L \geqq 10d$$

$$l \geqq 5d$$

Through the agency of the lever arm 17 and by means of the spring 23, the tension of which is accommodated to the operating conditions by the adjustment screw 29, the guide shoe 18 is pressed against the welding wire 8 which is guided by means of the conducting tube 22, so that the position of such welding wire 8 is clearly fixed by the guide grooves 19 and 20 and there is ensured for a faultless contact for the infeed of the current. The extension arm 16 is fixedly clamped by means of pins 28 and the handle screw or ball grip screw 24 through the agency of the clamping plate 25 at the support plate 26 which, in turn, is secured at the through-bored support bolt 27. The upper part of the lever arm 17 can freely move in the inner space bounded by the clamping plate 25 and the support plate 26. The current infeed is accomplished by means of the extension arm 16 and the guide groove 19. This extension arm 16 is advantageously equipped at its lower end, confronting the welding seam or weld, with a dog or projection 30 constructed as a cooling fin and which is set back in relation to the depth of the guide groove 19 in order to prevent any contact with the welding wire 8. The dog or projection 30 protects the extension or overhang arm 16 against overheating and prevents the dripping of liquidized material of the arm into the welding bath in the event of jumpover of the arc to the contact location (guide groove 19) due to malfunction of the welding wire feed. For reasons of electrical conductivity the extension arm 16 can be constructed of copper. It is particularly advantageous to form the extension arm 16 of non-magnetizable steel of substantially U-shaped cross-section, and for the purpose of increasing the electrical conductivity the space between the legs 16a of such U-shaped profile is preferably filled with a copper ledge, as generally designated by reference character 16b in FIG. 3b. It is possible to construct the lever arm 17, guide shoe 18, strap members 21 and each dog or projection 30 of high strength, non-magnetizable steel. The externally located parts of the wire feed clamp 9 are preferably equipped with a suitable temperature-resistant insulation, schematically indicated by reference character 50 in FIG. 3b, there being particularly useful ceramic oxides.

Figure 5:
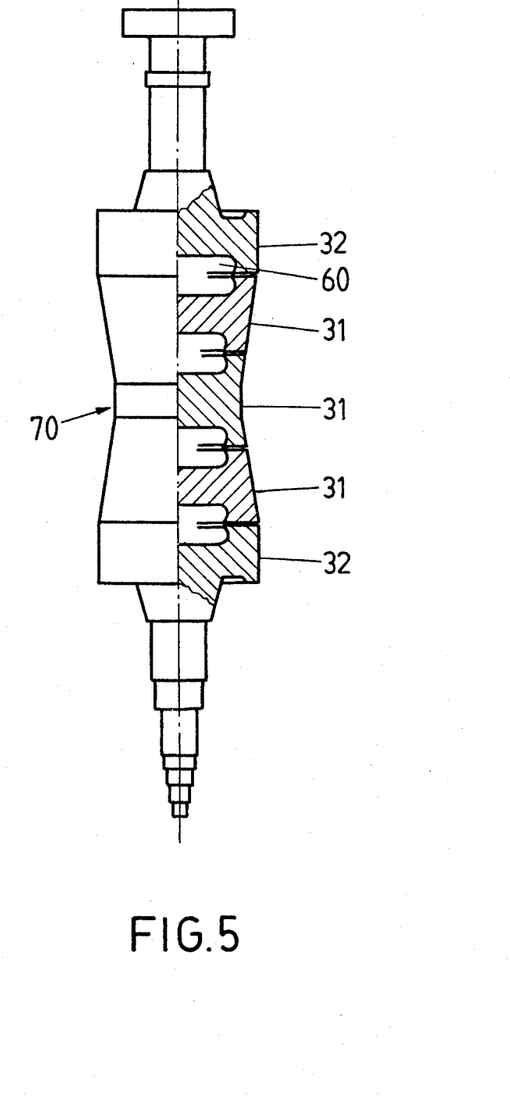
FIG. 5 schematically illustrates a high pressure rotor of a steam turbine produced by means of the inventive method.
Figure 6:
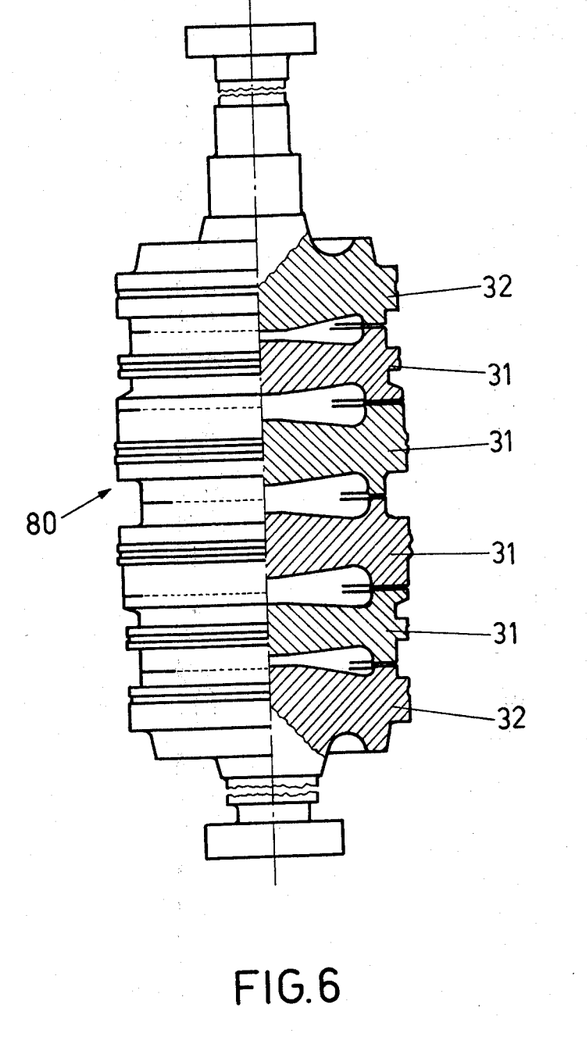
FIG. 6 schematically illustrates a low pressure rotor of a steam turbine produced with the method of the invention.
Figure 7:
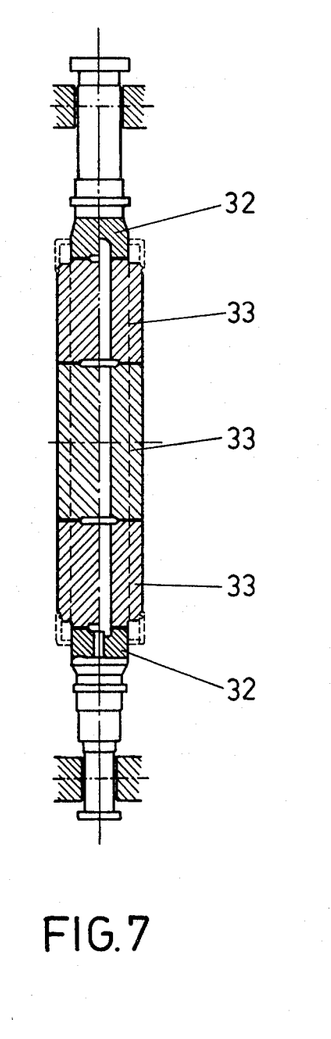
FIG. 7 schematically illustrates the rotor of a turbogenerator.

FIGS. 5, 6 and 7 illustrate exemplary embodiments of the field of application of the welding method and the apparatus used for the performance thereof, as described heretofore in conjunction with FIGS. 1 to 4. All of the examples relate to the interconnection of rotationally symmetrical bodies of the heavy-duty machine industry. It should be understood that the inventive method and the previously discussed apparatus also can be employed for processing bodies of different geometrical shapes. In particular, the method can be utilized to advantage in conjunction with thick-walled metallic parts which are only accessible from one side and therefore can not be subsequently welded at the root face or side. Examples of such are plates, sheets, tubes, discs, hollow cylinders composed of low-alloy as well as high-alloy metallic materials. A preferred field of application is the fabrication of rotor bodies of energy-converting machinery composed of individual bodies of rotation possessing hollow spaces or chambers or end face-recesses or indentations, as schematically indicated for instance in FIG. 5 by reference character 60. A preferred embodiment contemplates processing disc-shaped and hollow cylindrical-shaped forged parts which are employed for the construction of rotors of steam- and gas turbines, compressors as well as turbo-generators. Especially suitable as the workpiece parts which are to be interconnected are discs or plates of the same strength or the same thickness.

Now turning in particular to the showing of FIG. 5, there is illustrated therein a high pressure rotor 70 of an 1160 MW-steam turbine of 9000 mm length and a weight of 75000 kp. The intermediate portion of the rotor is assembled together from discs or plates 31 of essentially the same thickness which carry at the outer periphery at both sides an end face-proturberance or bead, which also should be considered as discs having end face-recesses or indentations 60, as previously explained. Serving as the axial closure are the forged parts merging into a respective stub shaft 32.

Considering now FIG. 6, wherein generally the same reference characters have been employed for the same or analogous components as in FIG. 5, there is illustrated therein a low pressure rotor 80 which is constructed in analogous manner of discs 31 of the same strength and equipped with appropriate stub shafts 32, for a 320 MW-steam turbine having a length of 5500 mm and a weight of 48000 kp.

Finally, FIG. 7 shows the principal construction of a welded rotor for a turbogenerator formed of drums (hollow cylinders 33) and stub shafts 32.

By means of the inventive method and the inventive and novel apparatus there is rendered possible for all those fields of application the interconnection of metallic parts by low volume welding seams (narrow gap welding) satisfying high quality requirements where for constructional reasons it is impossible to further weld at the root face or side. The method works with high economies and produces an inclusion-free, fine-grain structure at the connection locations of the workpiece parts, rendering superfluous any subsequent normalization or heat-treatment.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. An apparatus for interconnecting metallic parts by arc fusion welding with a low volume welding seam (narrow gap welding) comprising:
   means for feeding and guiding a welding wire;
   means for infeeding welding powder;
   said guiding means for the welding wire comprising a tool incorporating a wire feed clamp;
   said wire feed clamp being pivotable transversely to the wire feed direction through a predetermined angle and fixedly adjustable in a desired position;
   said wire feed clamp comprising:
      arm means equipped with a guide groove extending essentially in the lengthwise direction of said arm means;
      said arm means being formed of a material of high electrical conductivity;
      a freely rotatably mounted lever arm containing a pivotable guide shoe equipped with a guide groove;
      means interconnecting the lever arm with said arm means;
      tube means arranged between the overhang arm means and the lever arm for infeeding the welding wire to a contact location of the wire feed clamp;
      spring means;
      means for adjusting said spring means;

said welding wire being pressed by the lever arm and guide shoe, under the action of the spring means, into the guide groove of said arm means;
clamping plate means;
support bolt means containing lengthwise extending bore means;
means for attaching said arm means and the lever arm and said clamping plate means to said support bolt means; and
pin means for securing said arm means at said support bolt.

2. The apparatus as defined in claim 1, wherein:
said attaching means includes ball grip screw means.

3. The apparatus as defined in claim 1, wherein:
the width of said arm means and said guide shoe at the region of the guide groove is essentially equal to the thickness of the welding wire.

4. The apparatus as defined in claim 3, wherein:
the height of the guide shoe amounts to at least fivefold the thickness of the welding wire and the height of a part of the arm means structured for accommodating the width of the wire thickness amounts to at least ten-fold the thickness of the welding wire.

5. The apparatus as defined in claim 1, wherein:
said arm means is formed of copper.

6. The apparatus as defined in claim 1, wherein:
said arm means is formed of non-magnetizable steel possessing a substantially U-shaped cross-section and having leg means;
said leg means of said U-shaped arm means being equipped with copper ledge means in order to increase the electrical conductivity of the space between said leg means.

7. The apparatus as defined in claim 1, further including:
projection means provided for said arm means;
said projection means being set back with respect to the depth of the guide groove of the arm means and providing cooling fin means;
said projection means protecting the material of the arm means from overheating and upon spark-over of the arc at the contact location, due to disturbance of the welding wire-feed, preventing dripping of liquid material of the arm means into the welding bath.

8. The apparatus as defined in claim 7, wherein:
said lever arm, guide shoe, interconnecting means and projection means each are formed of high-strength, non-magnetizable steel.

9. The apparatus as defined in claim 1, wherein:
said wire feed clamp includes external portions equipped with a temperature-resistant insulation means.

10. The apparatus as defined in claim 9, wherein:
said temperature-resistant insulation means is ceramic oxide.

11. The apparatus as defined in claim 1, wherein:
said interconnecting means comprises at least two straps.

12. An apparatus for interconnecting metallic parts by arc fusion welding with a low volume welding seam (narrow gap welding) comprising:
means for feeding a welding wire in a feed direction and comprising a wire feed clamp;
said wire feed clamp being pivotable transversely to the wire feed direction and fixedly adjustable in a desired position;
said wire feed clamp comprising:
arm means equipped with a guide groove extending in the lengthwise direction of said arm means;
a freely rotatably mounted lever arm containing a pivotable guide shoe equipped with a guide groove;
means for interconnecting the freely rotatable lever arm with said overhang arm means;
conduit means arranged between the arm means and the lever arm for infeeding the welding wire to a contact location;
spring means;
means for adjusting said spring means;
said welding wire being pressed by the lever arm and guide shoe, under the action of the spring means, into the guide groove of the arm means;
clamping plate means;
support means containing lengthwise extending bore means;
means for securing the arm means and the lever arm and said clamping plate means at said support means; and
means for securing said arm means at said support means.

* * * * *